UNITED STATES PATENT OFFICE.

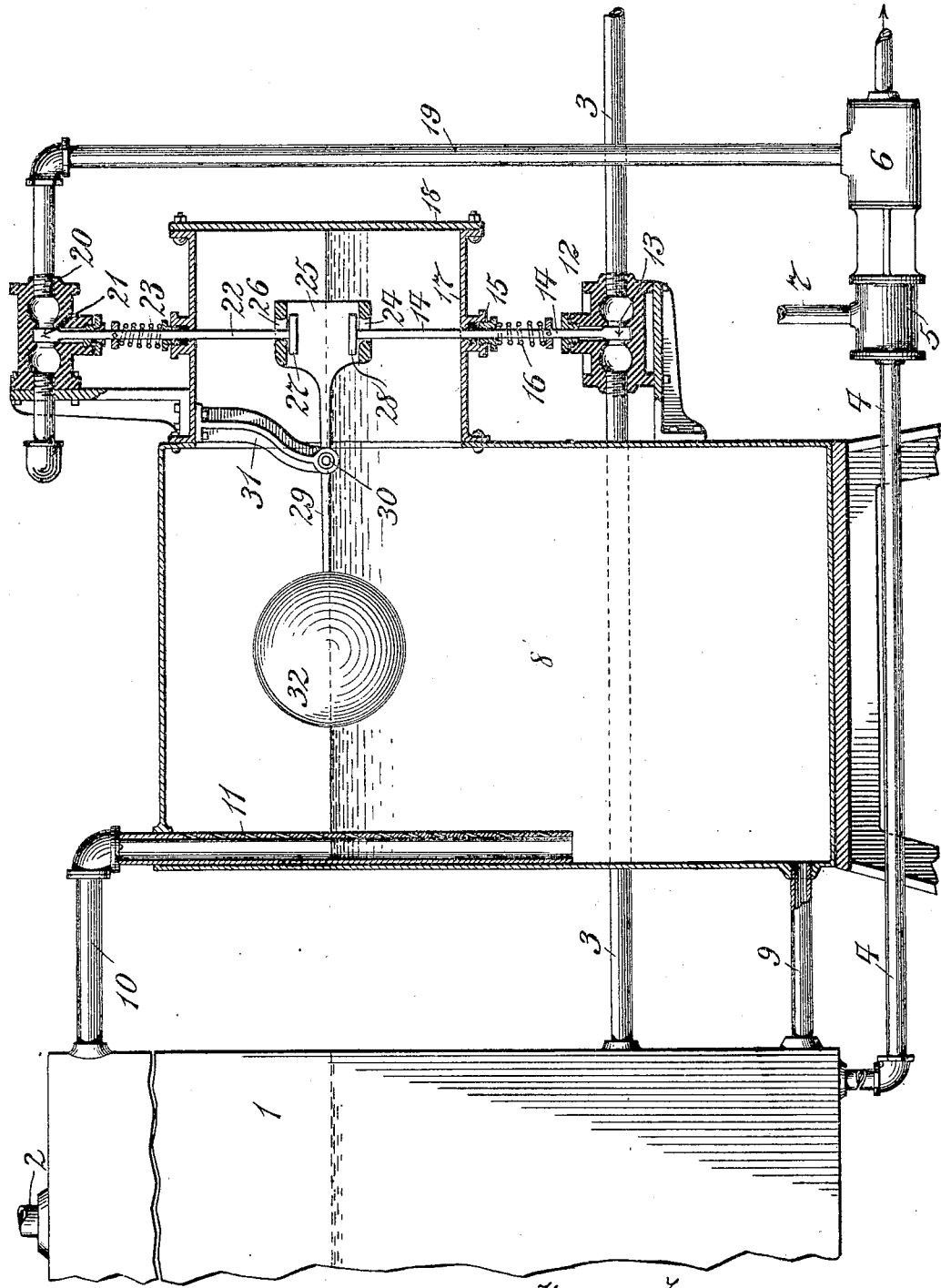

THOMAS FERGUSON, OF NEW YORK, N. Y.

WATER-LEVEL REGULATOR.

No. 795,346.          Specification of Letters Patent.          Patented July 25, 1905.

Application filed February 15, 1905. Serial No. 245,703.

*To all whom it may concern:*

Be it known that I, THOMAS FERGUSON, a citizen of the United States, residing in the borough of Brooklyn, city and State of New York, have invented a certain new and useful Improvement in Water-Level Regulators, of which the following is a specification.

In many kinds of steam-producing plants either for steam heating or power it is found expedient to employ a so-called "open heater" intermediate the return steam-pipes and the main steam-generator. In power-plants this takes the form of a condenser wherein the exhaust-steam is mingled with cold water for condensation purposes.

My present invention relates to apparatus whereby the flow of water either in or out, or both in and out, of tanks, boilers, or other receivers may be regulated, and in its more specific embodiment herein shown and described in detail my invention relates to a regulating attachment for vessels containing both steam and water—such, for instance, as the open heaters above mentioned.

My invention can be quickly and economically applied to any tank, open heater, or other receiver, and one of its principal advantages is its perfect reliability and its adaptability to any desired degree of sensitiveness in regulation.

The invention is illustrated in a preferred embodiment in the accompanying drawing, which is a sectional view of the apparatus, showing its preferred relation to the tank to be regulated, and this latter being shown broken or interrupted to indicate indefinite size.

In the drawing the main tank is shown at 1, the return steam-pipe entering at 2 and the cold-water supply coming in by the pipe 3.

At 4 is shown a pipe through which water is withdrawn from the tank, either to be delivered to a main boiler or to be otherwise disposed of. In any case the withdrawal of water is accomplished by the pump 5, which is driven in any well-known manner by the steam-cylinder 6. From the cylinder 5 the water is delivered through the pipe 7.

My regulating or governing attachment comprises a relatively small auxiliary tank 8, supported in any desired manner at such a height as to conform substantially to the desired normal water-level in the tank 1. The pipe 9 connects the main and auxiliary tanks below the water-level, while connection between the two is afforded above the water-level by the pipe 10, the end of which is preferably turned downward, as shown, so as to extend well toward the bottom of the auxiliary tank under the water therein.

The pipe 9 permits circulation of water between the two tanks, and the pipe 10 accommodates the steam. Thus the water is always kept at the same level in the two. Steam escapes from the pipe 10 into the auxiliary tank through perforations in the pipe-wall which are preferably inclined upward, as shown at 11. This directs the escaping steam in upward jets which entirely avoid the movable parts of the device, thus avoiding danger of disturbance of operation from this source.

Inlet and outgo of water into and out of the main tank 1 are controlled as follows: The inlet-pipe 3, which is supplied from any desired source of water under pressure, is provided with a valve 12, which may be of any desired character and is preferably a plain slide-valve—such, for instance, as is shown in the drawing. This valve is provided with a vertical slide 13, commanded by a rod 14, which passes through a stuffing-box 15 into the auxiliary tank. A spring 16 is applied so as to act on the rod 14 with a constant tendency to close the valve at 13.

I prefer to construct the auxiliary tank with an offset 17, permitting convenient use of a rod or rods projecting from the top or bottom, or both. This offset is preferably provided with a cover 18, which can be removed to permit access to the interior.

In the complete double form specifically shown in the drawing a pipe 19 is provided, which leads live steam to the cylinder 6, driving the pump 5. This steam is controlled by a valve 20 of appropriate character and preferably of the sliding type shown, wherein a slide 21 is commanded by a rod 22 passing through a stuffing-box into the auxiliary tank, preferably at the offset 17. A spring 23 is applied to keep the valve 20 normally closed.

In the drawing the water-valve rod 14 enters the bottom of the offset 17, while the steam-valve rod 22 enters the top thereof. This specific arrangement is, however, not essential to my invention. In the form illustrated the rod 14 passes through a perforation 24 in the lifting-block 25, while the rod 22 passes through a similar perforation 26 in the same block. At the end of each rod there is a cross-piece or enlargement, as shown, respectively, at 27 and 28, and these cross-pieces are of such a size as not to pass through the perforations 24 26. The lifting-block 25 is carried by a lever 29, pivoted at 30 to a bracket 31, and a float 32 is fixed to the opposite end of said lever.

When the water is at the desired normal level, the movable parts occupy the position shown in the drawing, with valves 12 and 20 closed and the lifting-block so related to the cross-pieces 27 28 that movement one way or the other will open one valve or the other. The ball 32 is so weighted that when the water-level is materially lowered the ball will descend and, acting through the lever 29 and lifting-block 25, will lift the rod 14 and slide 13, so as to admit water through the pipe 3 to the tank 1. The upper valve remains unaffected, as lost motion is permitted by the related construction of the perforated lifting-block and the cross-piece 27. The new water coming in will raise the level to normal, the ball 32 will rise, and the spring 16 will be permitted to close the valve 12 again. If condensation of steam or other cause unduly raises the water-level in the tank 1, the ball 32 will rise above normal and, the lifting-block 25 being depressed, the rod 22 will pull open the valve 20 and admit steam to start the pump 5. This will again lower the water-level and bring the ball 32 once more to normal. At the same time the valve 12 will remain unacted upon.

While in the specific form illustrated I have shown the use of a double lifting-block 25 and two valves, it is to be understood that my invention is not limited to an apparatus wherein both the outlet and the inlet of water is governed. In some installations where my device would be useful only one of these functions would be necessary or desirable.

A variety of modified forms of my device can be constructed without departing from the spirit of my invention, and I am not to be understood as limiting myself to the details herein shown and described.

What I claim is—

1. In a device of the class described, a main tank supplied with water, a steam and auxiliary tank, a water connection between the two, a steam connection between the two, a steam-pump connected to said tank for withdrawing water therefrom, a valve controlling access of steam to said pump, a float and pivoted lever within the auxiliary tank, and a mechanical connection between said steam-valve and said pivoted lever arranged to transmit motion from the lever to the valve in one direction, while permitting the lever to move in the opposite direction without affecting said valve, substantially as described.

2. In a device of the class described, a main tank supplied with water and steam, an auxiliary tank, a water connection between the two and a steam connection between them comprising a pipe extending downwardly into the auxiliary tank and having inclined perforations for escape of steam, substantially as described.

3. In a device of the class described, a main tank supplied with water and steam, an auxiliary tank, a water connection between the two and a steam connection between them comprising a pipe extending downwardly into the auxiliary tank close to one wall thereof and having inclined perforations for the escape of steam, substantially as described.

4. In a device of the class described, a tank having an offset portion, a pivoted lever within said tank extending from the main compartment thereof into said offset portion, a float on said lever in the main compartment, a lifting-block on the opposite end of said lever, two exterior valves on opposite sides of said offset portion and two valve-rods extending from said valves into said offset portion and engaging with said lifting-block, substantially as described.

5. In a device of the class described, a tank, a pivoted lever within the tank, a float at one end of said lever, a lifting-block at the other end thereof, a valve without the tank and a mechanical connection between said valve and lifting-block arranged to transmit motion from the block to the valve in one direction while permitting the block to move in the opposite direction without affecting said valve, substantially as described.

6. In a device of the class described, a tank, a pivoted lever therein, a float at one end thereof, a lifting-block on the other end of said lever, a valve on each side of the lifting-block outside of the tank and a mechanical connection between each valve and said lifting-block, each connection being arranged to transmit motion from the block to the valve in one direction while permitting the block to move in the opposite direction without affecting said valve, substantially as described.

7. In a device of the class described, a tank, a pivoted lever therein, a float at one end thereof, a lifting-block on the other end of said lever comprising a perforated portion, a valve outside the tank, a valve-rod extending from the valve into the tank and through the aforesaid perforation in the lifting-block, a cross-piece on said rod behind said perforation and means tending constantly to close said valve, substantially as described.

8. In a device of the class described, a tank, a pivoted lever therein, a float on one end thereof, a double lifting-block on the other end comprising two perforated portions, two exterior valves, valve-rods extending from each valve into the tank and each through one of said perforations, cross-pieces on said rods and means tending to hold both of said valves closed, substantially as described.

THOMAS FERGUSON.

Witnesses:
 H. S. MacKaye,
 Florence Pick.